(12) United States Patent
Reip

(10) Patent No.: X4199
(45) Date of Patent: Sep. 27, 1825

(54) OVENS, BAKE

(76) Inventor: Henry Reip

United States Patent

Patent No.: X4199

[illegible]

1410 wrd

United States Patent
Patent No.: X4199
No Printed Specification Available
4199X
H. REIP.
BAKE OVEN.
Patented Sept. 27, 1825.
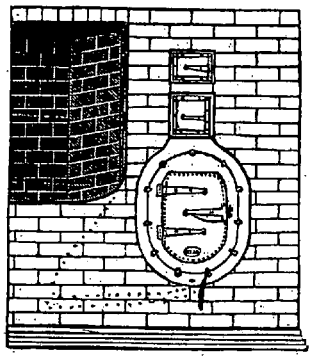
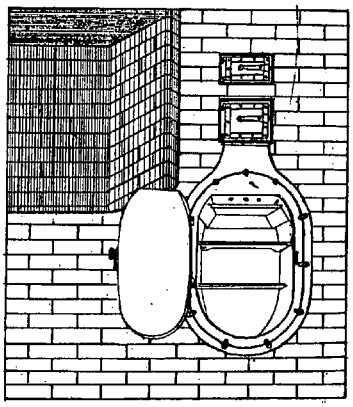
THE NORRIS PETERS CO., PHOTO-LITHO., WASHINGTON, D. C.

United States Patent
Patent No.: X4199
X4199
H. REIP.
BAKE OVEN.
Patented Sept. 27, 1825.
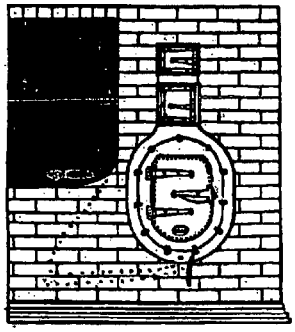
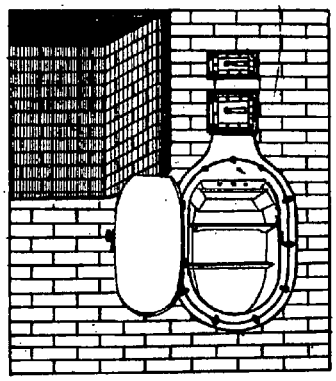
THE NATIONAL PATENT CO. PHOTOLITHO WASHINGTON, D.C.